United States Patent [19]

Swars

[11] Patent Number: 5,004,370
[45] Date of Patent: Apr. 2, 1991

[54] HOLLOW SHAFT HAVING DRIVE ELEMENTS WITH AXIALLY VARIED MATERIAL PROPERTIES BEING SECURED ON THE HOLLOW SHAFT BY EXPANSION OF THE HOLLOW SHAFT

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 196,150

[22] Filed: May 19, 1988

[30] Foreign Application Priority Data

May 25, 1987 [DE] Fed. Rep. of Germany ....... 3717534

[51] Int. Cl.$^5$ .............................................. B25G 3/28
[52] U.S. Cl. ..................................... 403/277; 403/5; 403/248
[58] Field of Search ...................... 148/147, 149, 152; 403/277, 5, 248

[56] References Cited

U.S. PATENT DOCUMENTS 4,674,312  6/1987  Cook ................................ 148/147 X
4,750,250  6/1988  Maus et al. ........................ 29/523 X

FOREIGN PATENT DOCUMENTS 0190841   8/1986  European Pat. Off. .
0213529   3/1987  European Pat. Off. .
3227693   1/1984  Fed. Rep. of Germany .
3616901  11/1986  Fed. Rep. of Germany .

OTHER PUBLICATIONS

Patent Abstracts of Japan, vol. 6, No. 256, Dec. 15, 1982; Japan 57-149655 (Nissan Tidosha K. K.) Sep. 16, 1982, The entire summary is pertinent.

Primary Examiner—Andrew V. Kundrat
Attorney, Agent, or Firm—Herbert L. Lerner; Laurence A. Greenberg

[57] ABSTRACT

An assembly includes a hollow shaft and drive elements partly formed of brittle material. The drive elements include, as viewed in axial succession, first regions containing material of relatively low ductility and second regions containing material of relatively high ductility. The hollow shaft has expanded sections opposite the second regions securing the drive elements on the hollow shaft.

16 Claims, 1 Drawing Sheet

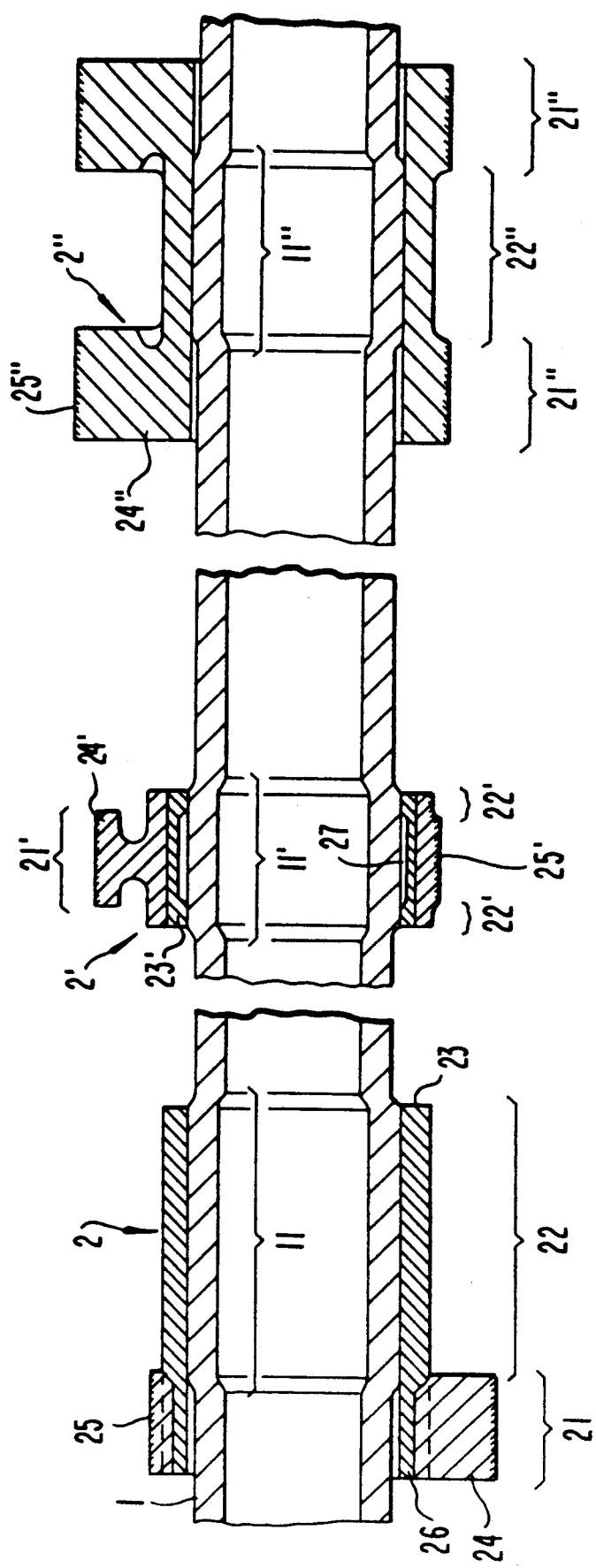

HOLLOW SHAFT HAVING DRIVE ELEMENTS WITH AXIALLY VARIED MATERIAL PROPERTIES BEING SECURED ON THE HOLLOW SHAFT BY EXPANSION OF THE HOLLOW SHAFT

BACKGROUND OF THE INVENTION

1. Field of the Invention

The invention relates to a hollow shaft having drive elements partly formed of brittle material, being secured on the hollow shaft by expansion of sections of the hollow shaft.

2. Description of the Related Art

In Published European Patent Application No. 0 213 529, corresponding to allowed U.S. application Ser. No. 900,387, filed Aug. 26, 1986, now U.S. Pat. No. 4,750,250 having an inventor in common with the instant application, a method has been proposed for fastening drive elements, such as cams, gear wheels or bearing bushings, on a hollow shaft. The hollow shaft is a commercially available pipe or tubing, onto which the elements are slipped and then secured by expansion of the sections of the tubing located beneath them. In order to avoid expensive subsequent finishing of the shaft after assembly, the drive elements should already be largely completely machined prior to assembly. This may also include hardening of the surface thereof. In order to seat the drive elements firmly on the shaft, the shaft must be deformed plastically by the expansion process, while the deformation of the drive elements remains in the elastic range, so that they can spring back at the end of the expansion process. It has now been demonstrated that the hardened surface of the drive elements tends to form fissures during the elastic deformation thereof.

SUMMARY OF THE INVENTION

It is accordingly an object of the invention to provide a hollow shaft having drive elements with axially varied material properties being secured on the hollow shaft by expansion of the hollow shaft, which overcomes the hereinafore-mentioned disadvantages of the heretofore-known devices of this general type and which simultaneously retains the advantage of being able to finish the drive elements virtually completely prior to assembly.

With the foregoing and other objects in view there is provided, in accordance with the invention, an assembly, comprising a hollow shaft, and drive elements partly formed of brittle material and including, as viewed in axial succession, first regions containing material of relatively low ductility, and second regions containing material of relatively high ductility, the hollow shaft having expanded sections opposite or facing the second regions securing the drive elements on the hollow shaft.

As will be explained below in conjunction with the description of the drawing, the drive elements can readily be constructed in such a way that they are assembled from a plurality of "disks", in axial succession, only some of which contain brittle material, for instance by virtue of being hardened The connection between the shaft and the drive elements then takes place only in the vicinity of those "disks" that contain material of high ductility. On the other hand, the "disks" that contain material of low ductility are not deformed by the fastening process.

In accordance with another feature of the invention, the hollow shaft is only expanded at the expanded sections opposite the second regions.

In accordance with a further feature of the invention, the first regions of the drive elements have a larger inside diameter than the second regions.

The increased inside diameter of the drive elements may be provided by being relieved in those regions in which they contain material of low ductility. This relieving is dimensioned in such a way that at the intended expansion pressure, the section of the hollow shaft facing the relieved or backed-off region and being subjected to the expansion process, does not come to rest on the drive element, so that this region likewise remains protected from even temporary deformation.

In accordance with an added feature of the invention, the drive elements are formed of originally homogeneous material made locally brittle by hardening processes.

In accordance with an additional feature of the invention, the drive elements include parts formed of different materials being locked or joined to one another, such as in a material-locking or form-locking manner.

In accordance with a concomitant feature of the invention, the second regions of the drive elements are formed of steel and the first regions are at least partly formed of grey casting material or of sintered material.

These elements may either be formed of a suitable engineering steel, for example, or may be formed of sintered material and may have been improved on the wearing surface thereof by means of one of the known hardening methods. On the other hand they may be initially formed of two or more parts connected to one another by welding, integral casting and/or suitable shaping. For example, one of the parts may be formed of steel having good ductility and the other part may be hard gray casting.

Other features which are considered as characteristic for the invention are set forth in the appended claims.

Although the invention is illustrated and described herein as embodied in a hollow shaft having drive elements with axially varied material properties being secured on the hollow shaft by expansion of the hollow shaft, having axially different material properties, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawing.

BRIEF DESCRIPTION OF THE DRAWING

FIGS. 1, 2 and 3 are fragmentary, diagrammatic, longitudinal axial-sectional views of a camshaft used as an example to show exemplary embodiments of the invention.

DESCRIPTION OF THE PREFERRED EMBODIMENT

Referring now to FIGS. 1, 2 and 3 of the drawing in detail in each figure there is seen a camshaft made up of a hollow shaft 1 formed of tubing originally having a continuously uniform cross section, and cams 2, 2', 2" which are secured on the hollow shaft 1 by expansion of certain sections 11, 11', 11" of the hollow shaft 1. As viewed axially, the cams 2, 2', 2" are successively formed of first regions 21, 21', 21" which contain material of low ductility, and second regions 22, 22', 22" which contain only material of high ductility.

In FIG. 1 an embodiment is shown having one individual cam 2 which is formed of a steel sheath 23 and a part 24 cast onto the steel sheath which is formed of a sintered material or gray casting/globular. The part 24 has a wearing surface layer 25 which, for example, has been induction-hardened, producing a hard peripheral layer (represented in the drawing by denser shading) In order to reinforce the material-locking engagement joining the two parts, a form-locking engagement is also provided by means of a set of longitudinal intermeshing teeth 26. A form-locking connection is one which connects two elements together due to the shape of the elements themselves, as opposed to a force-locking connection, which locks the elements together by force external to the elements. The steel sheath 23 may have a bearing surface quality permitting it also to be usable as a bearing shell. Only the section 11 of the hollow shaft 1 that faces the region 22 has been plastically deformed, and only this same section 11 of the hollow shaft 1 has been elastically deformed during the expansion process. The surface layer 25 that is vulnerable to fissuring has not been subjected to any loads during this process.

FIG. 2 shows another embodiment of an individual cam 2', in which a steel sheath 23' is put into place over the entire length between the cam part 24' having a surface layer 25' and the hollow shaft 1. However, wherever the steel sheath 23' faces the first region 21', it is provided with a relieved or backed-off portion 27, so that the region 21' does not undergo any deformation during the expansion process, even if the section 11' also includes the first region 21'.

Additionally, FIG. 3 shows a further embodiment of double cam 2" made from an originally homogeneous material, such as malleable cast iron, which is only locally hardened or in other words rendered brittle, by suitable treatment. In this case as well, the expanded section 11" again includes only a portion of the longitudinal extension of the cam 2" which has cam parts 24" having surfaces 25".

I claim:

1. Assembly, comprising a hollow shaft, and drive elements partly formed of brittle material and each including, as viewed in axial succession along said hollow shaft, a first region containing material of relatively low ductility, and a second rotationally symmetrical region containing material of relatively high ductility and being axially non-symmetrically connected to said first region, said hollow shaft having expanded sections only opposite said second regions securing said drive elements on said hollow shaft.

2. Assembly according to claim 1, wherein said drive elements are formed of originally homogeneous material made locally brittle by hardening processes.

3. Assembly according to claim 1, wherein said drive elements include parts formed of different materials being locked to one another.

4. Assembly according to claim 1, wherein said second regions of said drive elements are formed of steel and said first regions are at least partly formed of grey casting material.

5. Assembly according to claim 1, wherein said second regions of said drive elements are formed of steel and said first regions are at least partly formed of sintered material.

6. Assembly according to claim 1, wherein each of said drive elements is formed of a radially inner sheath extending throughout said first and second regions and a radially outer part disposed only at said first region.

7. Assembly, comprising a hollow shaft, and drive elements partly formed of brittle material and each including a first region containing material of relatively low ductility with two ends being axially spaced apart as viewed along said hollow shaft, and second rotationally symmetrical regions containing material of relatively high ductility each being connected to a respective one of said ends of said first region, said first region having a larger inside diameter than said second regions, and said hollow shaft having expanded sections at least opposite said second regions securing said drive elements on said hollow shaft.

8. Assembly according to claim 7, wherein said drive elements include parts formed of different materials being joined to one another.

9. Assembly according to claim 7, wherein said drive elements are formed of originally homogeneous material made locally brittle by hardening processes.

10. Assembly according to claim 7, wherein said second regions of said drive elements are formed of steel and said first regions are at least partly formed of grey casting material.

11. Assembly according to claim 7, wherein said second regions of said drive elements ar formed of steel and said first regions are at least partly formed of sintered material.

12. Assembly according to claim 7, wherein said first region has radial surfaces with holes formed therein.

13. Assembly according to claim 7, wherein each of said drive elements is formed of a radially inner sheath and a radially outer part extending throughout said first and second regions.

14. Assembly, comprising a hollow shaft, and drive elements partly formed of brittle material and each including two first regions containing material of relatively low ductility, and a second rotationally symmetrical region containing material of relatively high ductility with two ends being axially spaced apart as viewed along said hollow shaft, each of said ends being connected to a respective one of said first regions, and said hollow shaft having an expanded section only opposite said second region securing said drive elements on said hollow shaft.

15. Assembly according to claim 14, wherein said first and second regions are integral with each other.

16. Assembly according to claim 14, wherein said drive elements are formed of originally homogeneous material made locally brittle by hardening processes.

* * * * *